United States Patent
Ito

(10) Patent No.: US 9,527,473 B2
(45) Date of Patent: Dec. 27, 2016

(54) THROUGH ANCHOR

(71) Applicant: Enshu CO., Ltd, Iwata-shi, Shizuoka (JP)

(72) Inventor: Tadao Ito, Iwata (JP)

(73) Assignee: Enshu Co., Ltd., Iwata-shi (JP)

( * ) Notice: Subject to any disclaimer, the term of this patent is extended or adjusted under 35 U.S.C. 154(b) by 155 days.

(21) Appl. No.: 14/413,706

(22) PCT Filed: Dec. 18, 2013

(86) PCT No.: PCT/JP2013/083987
§ 371 (c)(1),
(2) Date: Jan. 9, 2015

(87) PCT Pub. No.: WO2015/092892
PCT Pub. Date: Jun. 25, 2015

(65) Prior Publication Data
US 2016/0272149 A1      Sep. 22, 2016

(51) Int. Cl.
*B60R 22/24* (2006.01)
*B60R 22/18* (2006.01)

(52) U.S. Cl.
CPC ........ *B60R 22/24* (2013.01); *B60R 2022/1831* (2013.01)

(58) Field of Classification Search
CPC ............... B60R 2022/1818; B60R 2022/1831; B60R 22/24
See application file for complete search history.

(56) References Cited

U.S. PATENT DOCUMENTS

| 5,037,135 A | 8/1991 | Kotikovsky et al. |
| 7,878,546 B2 * | 2/2011 | Tabata .................... B60R 22/18 |
| | | 280/801.1 |
| 2007/0138783 A1 * | 6/2007 | Gleason .................. B60R 22/24 |
| | | 280/808 |

FOREIGN PATENT DOCUMENTS

| DE | 102008025093 A1 * | 12/2009 | ............. B60R 22/18 |
| JP | S59-11739 U | 1/1984 | |
| JP | 2000153750 A  * | 6/2000 | |
| JP | 2013-091446 A | 5/2013 | |

OTHER PUBLICATIONS

Extended European Search Report dated Mar. 15, 2016, issued in corresponding EP Patent Application.

* cited by examiner

*Primary Examiner* — Ruth Ilan
(74) *Attorney, Agent, or Firm* — SOLARIS Intellectual Property Group, PLLC

(57) ABSTRACT

A through anchor (10), in which, when an occupant is restrained by a webbing (28) in a vehicle emergency, the webbing (28) is moved to the vehicle front side of an insertion hole (20) of a guide piece (18) due to movement of the occupant under inertia, and a vehicle front side end face of the webbing (28) contacts a displacement wall (26) of the guide piece (18) at high load. Rigidity of the displacement wall (26) of the guide piece (18) is reduced due to a displacement hole (24). The displacement wall (26) is accordingly deformed and displaced to the vehicle front side by the webbing (28), enabling occurrence of skewing of the webbing (28) toward the vehicle front side in the insertion hole (20) to be suppressed.

4 Claims, 6 Drawing Sheets

THROUGH ANCHOR

TECHNICAL FIELD

The present invention relates to a through anchor through which webbing applied to a vehicle occupant is inserted.

BACKGROUND ART

In a through anchor disclosed in Japanese Patent Application Laid-Open (JP-A) No. 2013-91446, a webbing insertion hole is formed passing through a metal plate, and a resin mold portion is fixed to the periphery of the webbing insertion hole of the metal plate. Furthermore, an insertion hole is formed to the resin mold portion, and the webbing is inserted in a length direction of the webbing through the insertion hole.

It would be preferable to be able to suppress the occurrence of skewing of the webbing toward the width direction in the insertion hole of the through anchor (so-called jamming).

DISCLOSURE OF INVENTION

Technical Problem

In consideration of the above circumstances, an object of the present invention is to obtain a through anchor capable of suppressing the occurrence of skewing of the webbing toward the width direction in the insertion hole.

Solution to Problem

A through anchor of a first aspect of the present invention includes: a main body member formed with a through hole; a slide support member that is fixed to a periphery of the through hole of the main body member, and that is formed with an insertion hole through which a webbing that is applied to a vehicle occupant is inserted in a length direction of the webbing such that the webbing is slidably supported; a displacement portion that is provided at the slide support member, and that configures a peripheral face of the insertion hole; and a displacement hole that is provided at the slide support member, that is disposed at an opposite side of the displacement portion from the insertion hole, and that enables displacement of the displacement portion in a case in which a width direction end face of the webbing has contacted the displacement portion.

A through anchor of a second aspect of the present invention is the through anchor of the first aspect of the present invention, wherein the displacement hole passes through the main body member.

A through anchor of a third aspect of the present invention is the through anchor of the first aspect or the second aspect of the present invention, wherein the displacement hole pierces through the slide support member.

A through anchor of a fourth aspect of the present invention is the through anchor of any one of the first aspect to the third aspect of the present invention, wherein a webbing width direction end portion of the insertion hole extends in a direction intersecting with the webbing width direction, and the displacement portion and the displacement hole extend in a direction intersecting with the webbing width direction.

Advantageous Effects of Invention

In the through anchor of the first aspect of the present invention, the main body member is formed with the through hole, and the slide support member is fixed to the periphery of the through hole of the main body member. Furthermore, the slide support member is formed with the insertion hole, and the webbing that is applied to the vehicle occupant is inserted through the insertion hole in the length direction of the webbing such that the slide support member slidably supports the webbing.

The displacement portion provided at the slide support member configures the peripheral face of the insertion hole, and the displacement hole provided at the slide support member is disposed at the opposite side of the displacement portion from the insertion hole, with the displacement hole enabling displacement of the displacement portion in a case in which the width direction end face of the webbing has contacted the displacement portion. Consequently, it is possible to increase the range of movement of the webbing in the insertion hole toward the width direction by displacement of the displacement portion when the width direction end face of the webbing has contacted the displacement portion, enabling occurrence of skewing of the webbing in the insertion hole toward the width direction to be suppressed.

In the through anchor of the second aspect of the present invention, the displacement hole passes through the main body member. The depth dimension of the displacement hole can accordingly be increased, enabling effective displacement of the displacement portion when the width direction end face of the webbing has contacted the displacement portion.

In the through anchor of the third aspect of the present invention, the displacement hole pierces through the slide support member. The depth dimensions of the displacement hole can accordingly be increased, enabling effective displacement of the displacement portion when the width direction end face of the webbing has contacted the displacement portion.

In the through anchor of the fourth aspect of the present invention, the webbing width direction end portion of the insertion hole extends in the direction intersecting with the webbing width direction.

Moreover, the displacement portion and the displacement hole extend in the direction intersecting with the webbing width direction. This enables the range of the displacement portion in contact with the width direction end face of the webbing to be increased, enabling occurrence of skewing of the webbing in the insertion hole toward the width direction to be suitably suppressed.

BEST MODE FOR CARRYING OUT THE INVENTION

First Exemplary Embodiment

Figure 1:
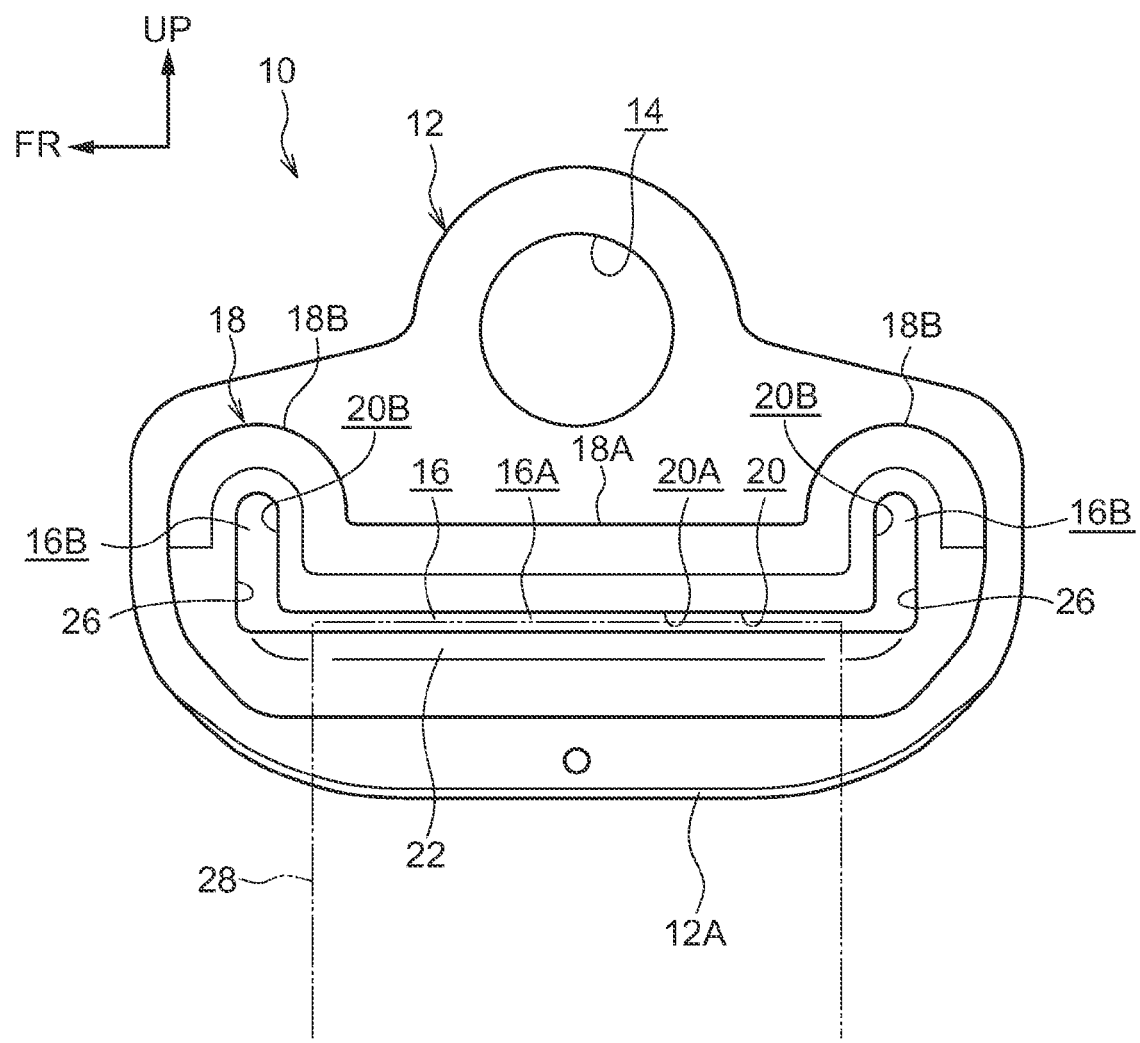
FIG. 1 is a face-on view illustrating a through anchor according to a first exemplary embodiment of the present invention, in a vehicle-attached state as viewed from the vehicle width direction inside.
Figure 2:
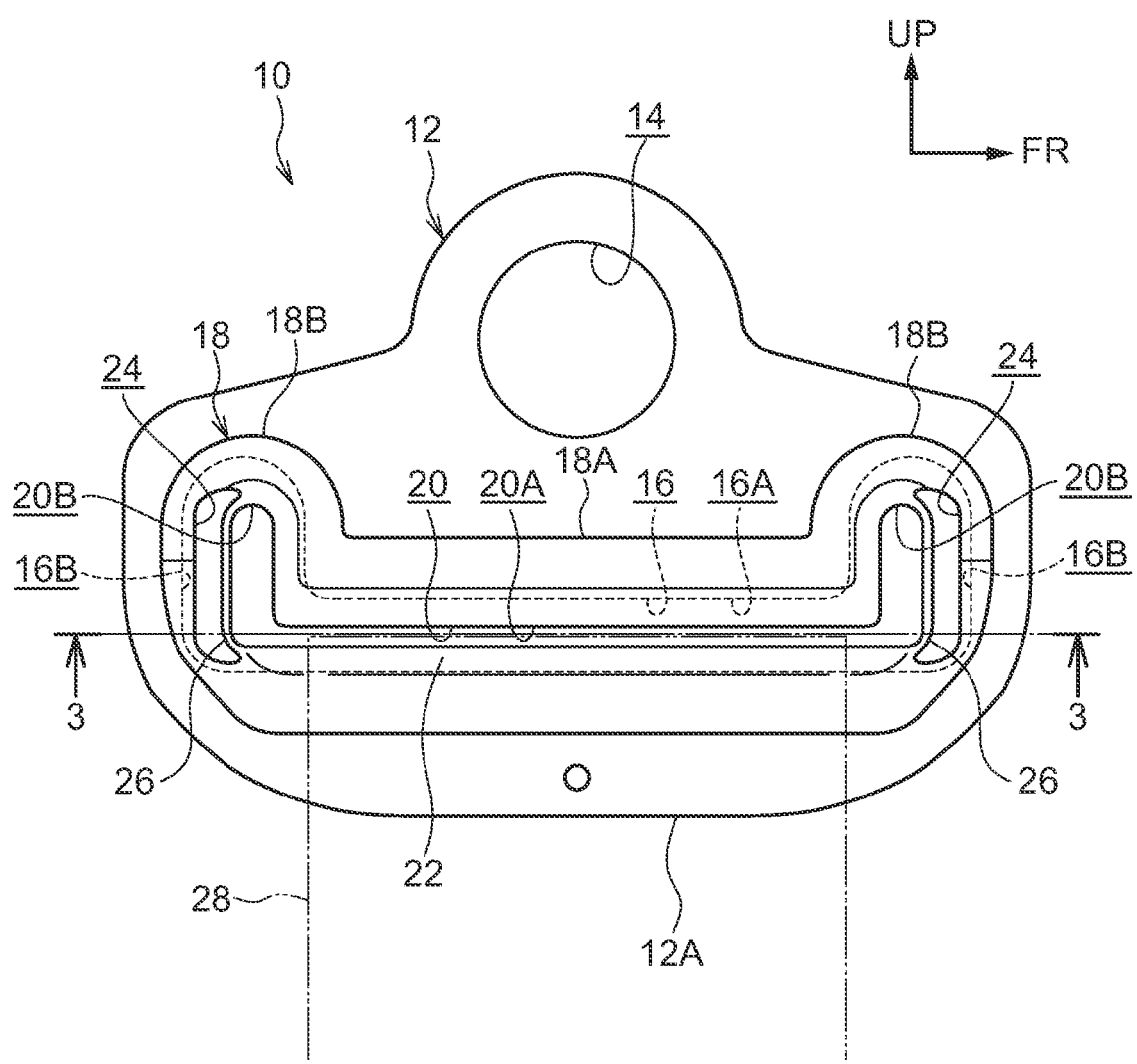
FIG. 2 is a back face view illustrating the through anchor according to the first exemplary embodiment of the present invention, in the vehicle-attached state as viewed from the vehicle width direction outside.
Figure 3:
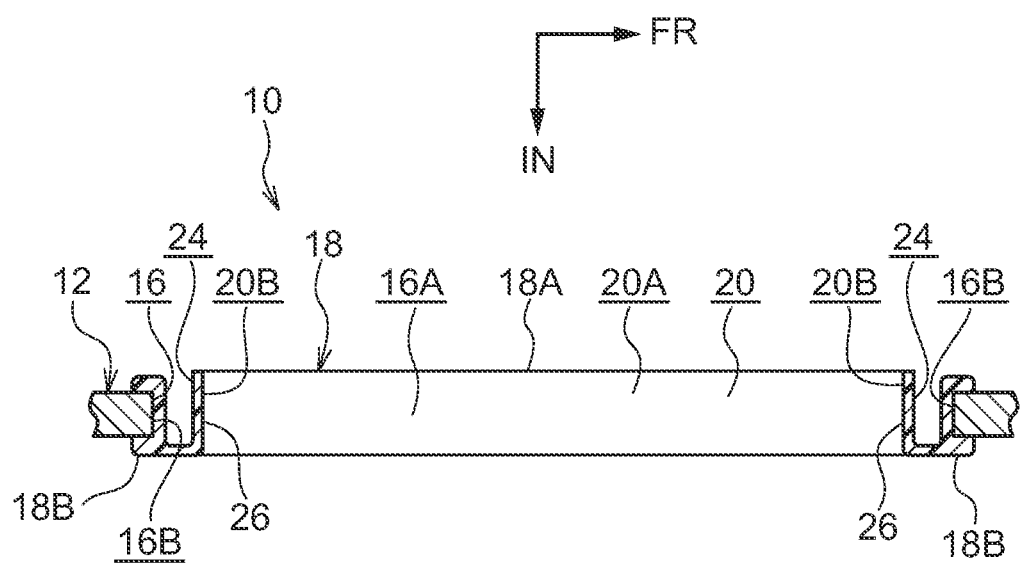
FIG. 3 is a cross-section view (a cross-section view along line 3-3 in FIG. 2) illustrating the through anchor according to the first exemplary embodiment of the present invention.

FIG. 1 is a face-on view of a through anchor 10 (the webbing hanger) according to a first exemplary embodiment of the present invention, in a vehicle-attached state as viewed from the vehicle width direction inside. FIG. 2 is a back face view of the through anchor 10, in the vehicle-attached state as viewed from the vehicle width direction outside. FIG. 3 is a cross-section view (a cross-section view of line 3-3 in FIG. 2) of the through anchor 10. Note that, in the drawings, the arrow FR indicates the vehicle front, the arrow IN indicates the vehicle width direction inside, and the arrow UP indicates upward when the through anchor 10 is attached to a vehicle.

The through anchor 10 according to the present exemplary embodiment is employed in what is referred to as a three-point seatbelt device as a so-called slip joint (shoulder anchor). The through anchor 10 is disposed at the vehicle width direction outside and the vehicle rear side of a vehicle body upper portion of a seat (not illustrated in the drawings) for seating an occupant in a vehicle (automobile).

Figure 4:
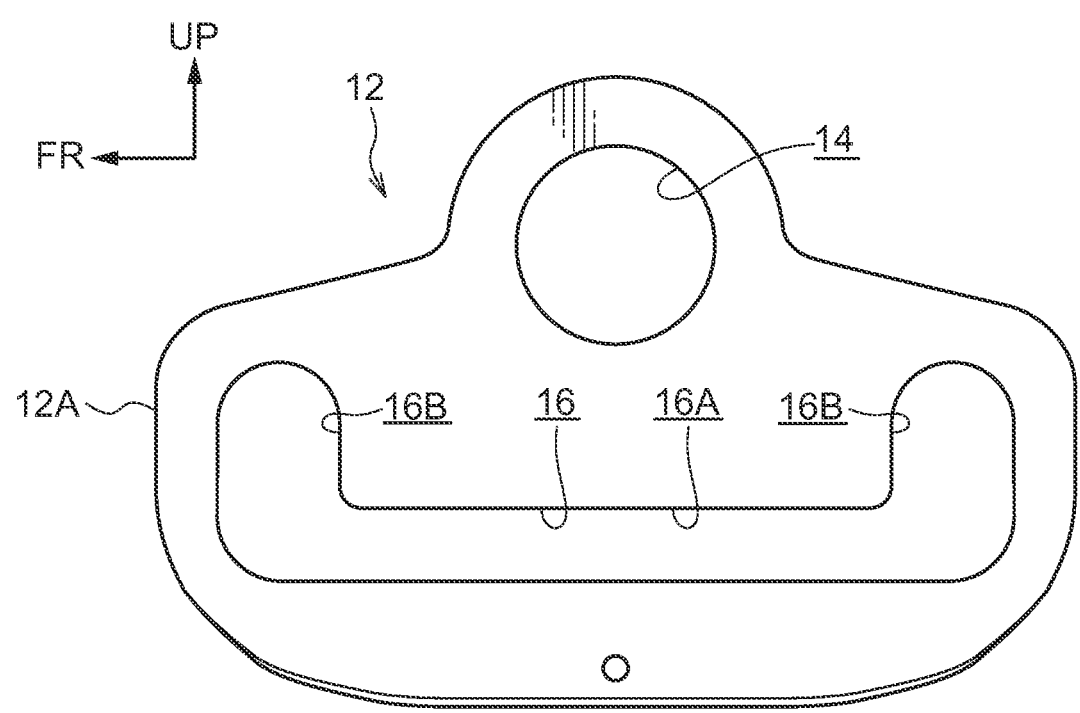
FIG. 4 is a face-on view illustrating an anchor plate of the through anchor according to the first exemplary embodiment of the present invention, in the vehicle-attached state as viewed from the vehicle width direction inside.

As illustrated in FIG. 1 to FIG. 3, the through anchor 10 includes a metal (steel material) plate shaped anchor plate 12 (see FIG. 4) as a main body member (strength member). The anchor plate 12 is manufactured by punch press working. An up-down direction intermediate portion of the anchor plate 12 is curved, and a portion of the anchor plate 12 more to a lower side than the curved portion slants toward the vehicle width direction inside on progression toward the lower side.

A circular shaped fixing hole 14 serving as an attachment portion is formed piercing through an upper portion of the anchor plate 12, and the anchor plate 12 is fixed (attached) to the vehicle body by a bolt (not illustrated in the drawings) fitted through the fixing hole 14. As a result, the through anchor 10 is capable of swinging in the vehicle front-rear direction about the bolt.

A through hole 16, configured as a U shape viewed from the vehicle width direction, is formed piercing through the curved portion of the up-down direction intermediate portion of the anchor plate 12. A center portion of the through hole 16 configures a central through hole 16A, and the central through hole 16A extends in the vehicle front-rear direction. End through holes 16B are configured at a vehicle front side end portion and a vehicle rear side end portion of the through hole 16, respectively. The end through holes 16B communicate with the central through hole 16A in the vehicle front-rear direction, and extend upward (in an orthogonal (intersecting) direction) with respect to the central through hole 16A.

A resin guide piece 18 serving as a slide support member (insertion portion) is molded (fixed) by being integrally molded (insert molding) to the up-down direction intermediate portion of the anchor plate 12. The guide piece 18 covers the entire periphery of the through hole 16 of the anchor plate 12 (the entire through hole 16 peripheral direction edge portion and inner peripheral face) from the vehicle width direction inside, the vehicle width direction outside, and the through hole 16 side. The guide piece 18 is only disposed at the vicinity of the entire periphery of the through hole 16, and the guide piece 18 does not cover the entire body of an outer periphery edge face 12A of the anchor plate 12.

A center portion of the guide piece 18 configures a central support portion 18A, and the central support portion 18A extends in the vehicle front-rear direction. End support portions 18B are configured at a vehicle front side end portion and a vehicle rear side end portion of the guide piece 18, respectively. The end support portions 18B are connected to the central support portion 18A in the vehicle front-rear direction, and extend upward (in an orthogonal (intersecting) direction) with respect to the central support portion 18A.

An insertion hole 20, configured as a U shape viewed from the vehicle width direction, is formed piercing through the guide piece 18. The insertion hole 20 is disposed inside the through hole 16 of the anchor plate 12 and is configured smaller than, and substantially similarly shaped to, the through hole 16. A center portion of the insertion hole 20 configures a central insertion hole 20A, and the central insertion hole 20A extends in the vehicle front-rear direction. End insertion holes 20B are configured at a vehicle front side end portion and a vehicle rear side end portion of the insertion hole 20. The end insertion holes 20B communicate with the central insertion hole 20A in the vehicle front-rear direction, and extend upward (in an orthogonal (intersecting) direction) with respect to the central insertion hole 20A.

A lower side face of the insertion hole 20 configures a slide face 22 (support face), and the slide face 22 is curved in a substantially semi-circular arc cross-section convex shape, as viewed from the vehicle front-rear direction.

A displacement hole 24 (reduced thickness indentation portion) is formed to each of the end support portions 18B of the guide piece 18, in the vicinity of the opposite side of the end insertion holes 20B from the central insertion hole 20A. The displacement holes 24 are open toward the vehicle width direction outside (the back face side of the guide piece 18). The displacement holes 24 are configured in a rectangular cross-section shape as viewed from the up-down direction, and the depth dimensions (the vehicle width direction dimensions) thereof are increased by the displacement holes 24 passing through the anchor plate 12 (the end through holes 16B of the through hole 16) to reach the vicinity of the vehicle width direction inside face of the guide piece 18 (the end support portions 18B). The displacement holes 24 extend in the up-down direction along the respective end insertion holes 20B, and the displacement holes 24 reach from the upper side to the lower side of the respective end insertion holes 20B. The peripheral faces of the displacement holes 24 are separated from the peripheral faces of the end through holes 16B of the anchor plate 12, and the displacement holes 24 are not exposed to the anchor plate 12 (the peripheral faces of the end through holes 16B).

A displacement wall 26 serving as a displacement portion is formed between the end insertion holes 20B and the displacement holes 24 at each of the end support portions 18B of the guide piece 18. The respective displacement walls 26 configure the entire peripheral face at the opposite side of the end insertion holes 20B from the central insertion hole 20A. The thickness dimensions (the vehicle front-rear direction dimensions) of the displacement walls 26 are reduced by the displacement holes 24, such that the strength of the displacement walls 26 is less than other portions of the guide piece 18. Note that the thickness dimensions of the displacement walls 26 are the same as the bottom walls (the vehicle width direction inside walls) of the displacement holes 24.

An elongated belt shaped webbing 28 is inserted through (passed through) the central insertion hole 20A (the central through hole 16A of the through hole 16) of the insertion hole 20 of the guide piece 18 so as to be movable in the length direction of the webbing. A base end side of the webbing 28, further to the vehicle width direction outside (vehicle outside) than the insertion hole 20, extends to the lower side of the through anchor 10, and is taken up on a take-up device (not illustrated in the drawings). The take-up device is fixed to the vehicle width direction outside and lower side of the seat for seating an occupant, and biases the webbing 28 in a take-up direction. A leading end side of the webbing 28, further to the vehicle width direction inside (vehicle interior side) than the insertion hole 20, extends to the lower side of the through anchor 10, and is fixed to the vehicle width direction outside and lower side of the seat. As a result, the webbing 28 contacts the slide face 22 of the insertion hole 20 and is supported (hangs) in a folded state due to the biasing force of the take-up device, such that the webbing 28 slides over and is guided by the slide face 22 when the webbing 28 moves in the length direction of the webbing with respect to the insertion hole 20.

The leading end side of the webbing 28 beyond the through anchor 10 (the insertion hole 20) is inserted through a tongue (not illustrated in the drawings) and the tongue is configured movable along the length direction of the webbing 28. A buckle (not illustrated in the drawings) is attached to the vehicle width direction inside and lower side of the seat, and the webbing 28 is applied to an occupant seated in the seat (not illustrated in the drawings) by pulling the webbing 28 out from the take-up device against the biasing force, and engaging the tongue in the buckle.

When the webbing 28 is applied to the occupant, the leading end side of the webbing 28 beyond the through anchor 10 (the insertion hole 20) extends from the through anchor 10 toward the vehicle front diagonal downward side, and the through anchor 10 swings toward the vehicle front side. Furthermore, pull-out of the webbing 28 from the take-up device is locked by the take-up device in the event of a vehicle emergency (such as a collision).

Explanation follows regarding operation of the exemplary embodiment.

In the through anchor 10 with the above-described configuration, the webbing 28 is movably inserted along the length direction of the webbing through the insertion hole 20 (the central insertion hole 20A) of the guide piece 18, and the webbing 28 is slidably supported by the slide face 22 of the guide piece 18.

In the event of a vehicle emergency (such as a collision), pull-out of the webbing 28 applied to an occupant from the take-up device is locked by the take-up device, and the occupant is restrained by the webbing 28. In such an event, due to movement of the occupant under inertia, the webbing 28 is moved to the vehicle front side (one width direction side of the webbing 28) of the insertion hole 20 (the central insertion hole 20A and the end insertion hole 20B), and the vehicle front side end face (one width direction side end face) of the webbing 28 contacts the vehicle front side displacement wall 26 of the guide piece 18 at high load.

Rigidity of the respective displacement walls 26 of the guide piece 18 is reduced by the displacement holes 24. As a result, when the vehicle front side end face of the webbing 28 has contacted the vehicle front side displacement wall 26 of the guide piece 18 at high load, as described above, the displacement wall 26 is deformed (tilting deformation about the vehicle width direction inside end portion of the displacement wall 26) and displaced to the vehicle front side (the displacement hole 24 side) by the webbing 28. This enables the range of movement of the webbing 28 in the insertion hole 20 toward the vehicle front side to be increased, enabling occurrence of skewing of the webbing 28 in the insertion hole 20 toward the vehicle front side (so-called jamming) to be suppressed.

Moreover, the depth dimensions of the displacement holes 24 of the guide piece 18 are increased by passing through the anchor plate 12, thereby effectively reducing the rigidity of the displacement walls 26 by the displacement holes 24. As a result, when the vehicle front side end face of the webbing 28 has contacted the vehicle front side displacement wall 26 at high load, as described above, the displacement wall 26 is effectively deformed and displaced to the vehicle front side by the webbing 28. This enables the range of movement of the webbing 28 toward the vehicle front side in the insertion hole 20 to be effectively increased, enabling occurrence of skewing of the webbing 28 in the insertion hole 20 toward the vehicle front side (so-called jamming) to be effectively suppressed.

Furthermore, the displacement holes 24 and the displacement walls 26 of the guide piece 18 extend in the up-down direction along the respective end insertion holes 20B of the insertion hole 20. As a result, when the webbing 28 is moved to the vehicle front side of the insertion hole 20 due to movement of the occupant under inertia, as described above, the range of the vehicle front side displacement wall 26 in contact with vehicle front side end face of the webbing 28 increases, and the displacement wall 26 is suitably deformed and displaced to the vehicle front side by the webbing 28. This enables the range of movement of the webbing 28 toward the vehicle front side in the insertion hole 20 to be suitably increased, enabling occurrence of skewing of the webbing 28 in the insertion hole 20 toward the vehicle front side (so-called jamming) to be suitably suppressed.

Moreover, the displacement holes 24 of the guide piece 18 are only open to the vehicle width direction outside (the back face side). As a result, the displacement holes 24 are less liable to be visible to an occupant present at the vehicle width direction inside of the through anchor 10, enabling deterioration in the appearance of the through anchor 10 due to the displacement holes 24 to be suppressed.

Note that, in the present exemplary embodiment, the displacement wall 26 is deformed and displaced by the webbing 28 when the width direction end face of the webbing 28 has contacted the displacement wall 26 of the guide piece 18 at high load. However, as well as, or instead of, this, the bottom wall (the vehicle width direction inside wall) of the displacement wall 26 may be deformed (such as by tilting deformation) and displaced by the webbing 28 when the width direction end face of the webbing 28 has contacted the displacement wall 26 of the guide piece 18 at high load.

In the present exemplary embodiment, the displacement holes 24 pass through the anchor plate 12 (the end through holes 16B of the through hole 16). However, the displacement holes 24 may be configured so as to reach the anchor plate 12 (the end through holes 16B of the through hole 16), and may be configured, for example, so as to reach a thickness direction intermediate portion of the anchor plate 12 (the end through holes 16B of the through hole 16)

Second Exemplary Embodiment

Figure 5:
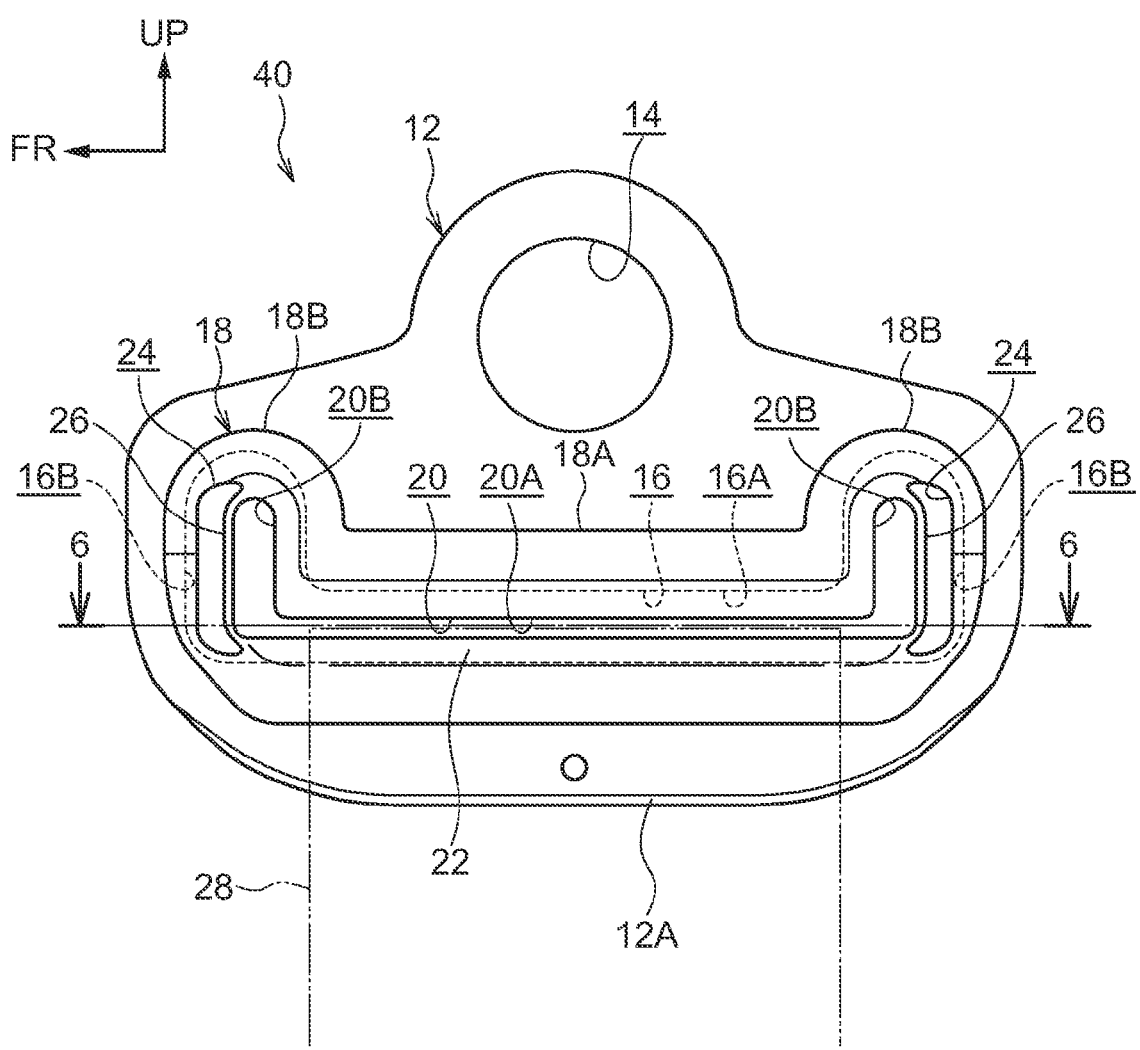
FIG. 5 is a face-on view illustrating a through anchor according to a second exemplary embodiment of the present invention, in a vehicle-attached state as viewed from the vehicle width direction inside.
Figure 6:
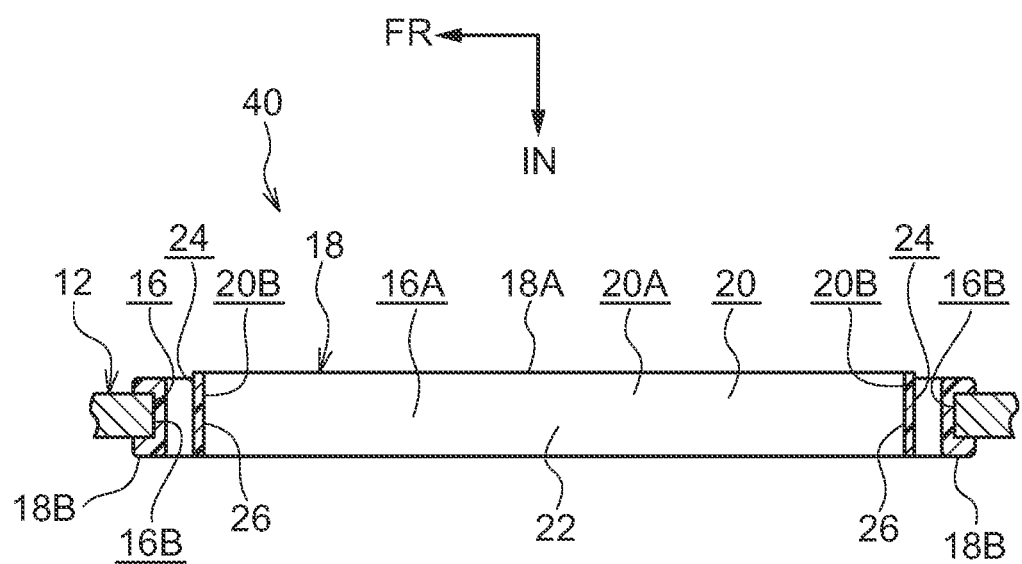
FIG. 6 is a cross-section view (a cross-section view along line 6-6 in FIG. 5) illustrating the through anchor according to the second exemplary embodiment of the present invention.

FIG. 5 is a face-on view of a through anchor 40 (the webbing hanger) according to a second exemplary embodiment of the present invention, in a vehicle-attached state as viewed from the vehicle width direction inside, and FIG. 6 is a cross-section view (a cross-section view of line 6-6 in FIG. 5) of the through anchor 40.

The through anchor 40 according to the present exemplary embodiment has substantially the same configuration as the first exemplary embodiment, differing in the following points.

As illustrated in FIG. 5 and FIG. 6, in the through anchor 40 according to the present exemplary embodiment, the depth dimensions (vehicle width direction dimensions) of displacement holes 24 of a guide piece 18 are increased by the displacement holes 24 (reduced thickness pierced portions) passing through an anchor plate 12 (end through holes 16B of a through hole 16), and piercing through end support portions 18B of the guide piece 18. As a result, the displacement holes 24 are open to the vehicle width direction outside (the back face side of the guide piece 18) and the vehicle width direction inside (the front face side of the guide piece 18).

The through anchor 40 according to the present exemplary embodiment can thereby exhibit similar operation and advantageous effects to the first exemplary embodiment, except for the operation and advantageous effects due to the displacement holes 24 only being opened to the vehicle width direction outside of the guide piece 18.

In particular, when the vehicle front side end face of a webbing 28 has contacted a vehicle front side displacement wall 26 of the guide piece 18 at high load in the event of a vehicle emergency (such as a collision), the displacement wall 26 is deformed (tilting deformation about the up-down direction end portions of the displacement wall 26) and displaced to the vehicle front side (the displacement hole 24 side) by the webbing 28. This enables the range of movement of the webbing 28 in the insertion hole 20 toward the vehicle front side to be increased, enabling occurrence of skewing of the webbing 28 in the insertion hole 20 toward the vehicle front side (so-called jamming) to be suppressed.

Furthermore, in the guide piece 18, by further increasing the depth dimensions of the displacement holes 24 by piercing through the guide piece 18, rigidity of the displacement walls 26 is even more effectively reduced by the displacement holes 24. As a result, when the vehicle front side end face of the webbing 28 has contacted the vehicle front side displacement wall 26 at high load, as described above, the displacement wall 26 is even more effectively deformed and displaced toward the vehicle front side by the webbing 28. This enables the range of movement of the webbing 28 in the insertion hole 20 toward the vehicle front side to be even more effectively increased, enabling occurrence of skewing of the webbing 28 in the insertion hole 20 toward the vehicle front side (so-called jamming) to be even more effectively suppressed.

Note that, in the first exemplary embodiment and the second exemplary embodiment, a cover (covering member) may be attached to the vehicle width direction inside of the anchor plate 12, such that the vehicle width direction inside of the anchor plate 12 (the displacement holes 24 of the guide piece 18 may also be included) is covered by the cover. In such a case, the webbing 28 may be passed through (inserted through) a passing hole by forming the passing hole to pierce through the cover, exposing the insertion hole 20 of the guide piece 18 to the vehicle width direction inside with the passing hole.

Note that the through anchors 10, 40 are applied to a slip joint in the first exemplary embodiment and the second exemplary embodiment. However, the through anchors 10, 40 may also be applied to a tongue.

EXPLANATION OF THE REFERENCE NUMERALS 10 through anchor
12 anchor plate (main body member)
16 through hole
18 guide piece (slide support member)
20 insertion hole
24 displacement hole
26 displacement wall (displacement portion)
28 webbing
40 through anchor

The invention claimed is:

1. A through anchor comprising:
a main body member formed with a through hole;
a slide support member that is fixed to a periphery of the through hole of the main body member, and that is formed with an insertion hole through which a webbing that is applied to a vehicle occupant is inserted in a length direction of the webbing such that the webbing is slidably supported;
a displacement portion that is provided at the slide support member, and that configures a peripheral face of the insertion hole; and
a displacement hole that is provided at the slide support member, that is disposed at an opposite side of the displacement portion from the insertion hole, and that enables displacement of the displacement portion in a case in which a width direction end face of the webbing has contacted the displacement portion.

2. The through anchor of claim 1, wherein the displacement hole passes through the main body member.

3. The through anchor of claim 1, wherein the displacement hole pierces through the slide support member.

4. The through anchor of claim 1, wherein a webbing width direction end portion of the insertion hole extends in a direction intersecting with the webbing width direction, and the displacement portion and the displacement hole extend in a direction intersecting with the webbing width direction.

* * * * *